ENERGY ABSORBED

United States Patent Office 3,014,129
Patented Dec. 19, 1961

3,014,129
INFRA-RED GAS ANALYSERS
Albert E. Martin, Newcastle-upon-Tyne, England, assignor to C. A. Parsons & Company Limited, Newcastle-upon-Tyne, England
Filed Sept. 13, 1955, Ser. No. 534,105
Claims priority, application Great Britain Sept. 14, 1954
1 Claim. (Cl. 250—43.5)

This invention relates to infra-red gas analysers of the kind wherein infra-red rays are passed by way of a rotary shutter device through two gas filled absorption tubes fitted at each end with windows transparent to these rays, the rays afterwards acting upon the contents of two chambers partitioned from one another by a thin metal diaphragm adjacent to a fixed electrode.

In such instruments the two latter chambers are filled with the gas to be detected and energy is absorbed as radiation passes through them according to the nature of infra-red absorption of the gas in question. As the gas heats up an increase of pressure is produced and any difference between the pressure in the two chambers causes the diaphragm to deform and so give rise to changes of capacity in respect to an insulated perforated metal plate which is fixed in close proximity to the diaphragm.

The radiation from the heaters passing through the two absorption tubes into the chambers is interrupted by a rotating shutter which admits radiation simultaneously to the tubes, and if both these contain gas with no infra-red absorption, the pressure pulses in the chambers will balance and no movement of the diaphragm will result, but if some of the gas to be detected is passed into one of the absorption tubes, energy will be absorbed before it can reach the corresponding detecting chamber.

The balance will now be upset and the diaphragm will vibrate at the frequency of interruption of the radiation.

The capacity changes are amplified electronically and finally an indication is obtained on a meter which can be calibrated in gas concentration.

Figure 1:
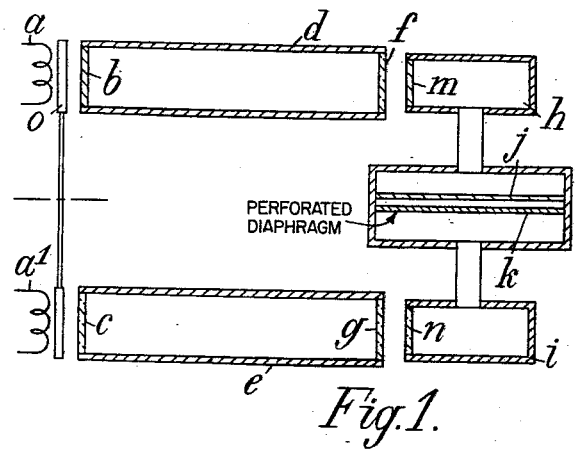

A typical instrument is shown in FIGURE 1 of the accompanying drawings in which two Nichrome (registered trademark) heaters $a$, $a'$ are adjacent respectively to transparent windows $b$, $c$ at one end of each of two absorption tubes $d$, $e$ furnished also at the other end with transparent windows $f$, $g$. The latter windows are disposed respectively adjacent to two chambers $h$, $i$ separated from each other by a thin metal diaphragm $j$ adjacent to a fixed insulated perforated plate $k$. The chambers $h$, $i$ are furnished with transparent windows $m$, $n$ and are filled with the gas to be detected and energy is absorbed as radiation passes through them according to the nature of infra-red absorption of the gas in question. As the gas in either chamber heats up an increase of pressure is produced tending to cause the diaphragm $j$ to deform. By means of a balancing shutter in one of the paths the energy absorbed in chamber $h$ can be made equal to the energy absorbed in chamber $i$ so that the pressure pulses on the diaphragm cancel out and there is no movement of the diaphragm. If now absorbing gas in the form of the sample under test is passed into one of the absorption tubes $d$ or $e$, the balance will be upset and the diaphragm will vibrate at the frequency of interruption of the radiation, this interruption being produced by a rotary shutter device $o$ which admits rays simultaneously to the two absorption tubes. Changes in the capacity of the perforated plate $k$ produced by the vibration of the diaphragm $j$ are amplified electronically and transmitted to means for recording the concentration in the sample of the gas to be detected.

In a case where a high concentration range is required for a gas with strong infra-red absorption, difficulty is experienced on account of the short path length required.

As an example, to make an instrument suitable for 0 to 100% $CO_2$, a path length of the order of 0.2 mm. is required in order to obtain a reasonably linear characteristic. The construction of such a cell offers considerable difficulty, since not only must sealing gaskets be provided but inlet and outlet tubes to carry the sample gas through the cell must be provided.

In the present invention the object is to provide means for overcoming this difficulty so that longer cells which can be readily manufactured can be used.

According to the invention a filter cell containing the gas under investigation or a gas having similar infra-red absorption properties, is interposed in the optical path between a cell containing the sample under test and the source of radiation so that the radiations most intensely absorbed by the gas are removed by the said filter tube and do not reach the sample cell or detecting chamber.

Figure 2:
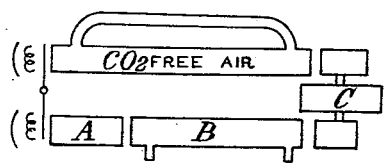

In a preferred form of the invention a filter tube A containing the gas under investigation is interposed in the optical path (FIGURE 2) so that the radiations most intensely absorbed by the gas are removed by the filter tube and do not reach the sample cell B or detecting condenser C. The gas analyser now operates normally with the remaining radiations which are absorbed less strongly by the sample gas and therefore permit the use of a longer path. Naturally, the filtering effect of cell A must not be too great or the sensitivity will be too low, but it is quite easy to increase the sample cell length from 0.2 to 2 mm. for $CO_2$ in the range 0 to 100%. Cells with a path length of 2 mm. are frequently used for other purposes and are regularly manufactured.

The quantity of $CO_2$ in the filter cell will of course affect the sensitivity of the instrument and it is necessary for the filter cell to be perfectly sealed.

As a guide to the quantity of gas required in the filter cells, about 90% of the absorption should take place in the filter cell and the remaining 10% in the sample cell; 10% by volume $CO_2$ in air in a tube 2 cm. long makes a satisfactory filter.

Figure 3A:
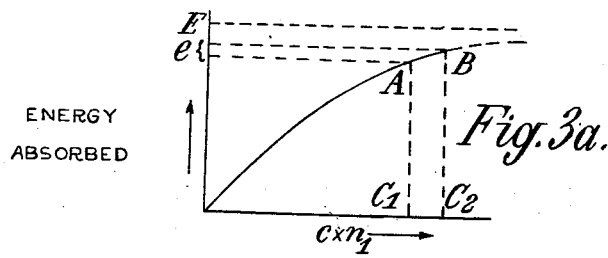

FIGURE 3a gives the relation between energy absorbed gas concentration multiplied by path length.

At low concentrations a linear relation is found, but as the concentration increases the curve flattens off and tends to approach the saturation value E. If the linearising filter has absorption corresponding to point A on the curve and if the additional absorption in the sample cell filled with 100% gas corresponds to point B, then it is good practice to make the energy difference $e$ about 10% of E.

Smaller energy differences may be used with improvement in linearity of final calibration, but instrument stability will tend to suffer. If $C_1$ and $C_2$ are percentages by volume of $CO_2$ in the filter cell corresponding to the points A and B, $n_1$ its length and $n_2$ the length of the sample cell, then for a given absorption the product of path length and concentration is a constant and $$C_1 \times n_1 + 100 \times n_2 = C_2 \times n_1$$

Figure 3B:
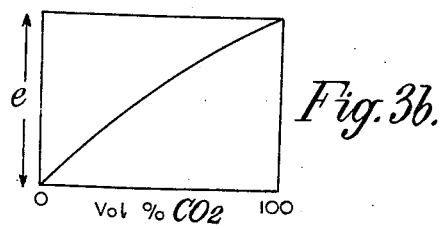

If $n_2$ is fixed, i.e. the shortest cell than can conveniently be made $(C_2-C_1)n_1$ is determined and all that is left is to decide from the shape of the curve of FIGURE 3a suitable values of $C_1$ and $C_2$ for a given length of tube, $n_1$ to give a satisfactory calibration curve as indicated in FIGURE 3b.

This means of linearising the calibration curve can of course be used with gases other than $CO_2$ but optimum filtering conditions will have to be determined in each case in the manner outlined.

I claim:
In an infra-red gas analyser of the kind in which infra-red rays from a source of radiation are passed by way of a rotary shutter device through two beam paths, one path containing a sample gas under test and the other path being a reference path in which infra-red absorption remains substantially constant, the rays subsequently falling on detection means comprising two chambers, one in each path partitioned from one another by a thin metal diaphragm adjacent a fixed electrode, said chambers being filled with the gas to be detected or a gas with similar infra-red absorption properties, the two beam paths being interrupted simultaneously at regular intervals by the rotary shutter device such that as the absorption by the sample gas varies a fluctuating signal is produced by the detection means representative of the quantity of gas to be detected present in the sample gas: the combination with the elements of the beam path containing the sample under test of a sealed radiation attenuating cell containing the gas to be detected, said attenuating cell being placed between the sample and the source of radiation, so that the radiations are attenuated by removing those most intensely absorbed by the gas in the attenuating cell and the less strongly absorbed remaining radiations only reach the sample gas cell or detecting means.

References Cited in the file of this patent

UNITED STATES PATENTS

| | | |
|---|---|---|
| 2,579,825 | Hutchins | Dec. 25, 1951 |
| 2,688,090 | Woodhull et al. | Aug. 31, 1954 |
| 2,709,751 | Meyer | May 31, 1955 |
| 2,718,597 | Heigl et al. | Sept. 20, 1955 |
| 2,741,703 | Munday | Apr. 10, 1956 |
| 2,754,424 | Woodhull | July 10, 1956 |

FOREIGN PATENTS

| | | |
|---|---|---|
| 643,086 | Great Britain | Sept. 15, 1950 |
| 698,023 | Great Britain | Oct. 7, 1953 |